Dec. 10, 1963  F. D. WERNER ETAL  3,114,125
TEMPERATURE PROBE
Filed April 18, 1961  5 Sheets-Sheet 1
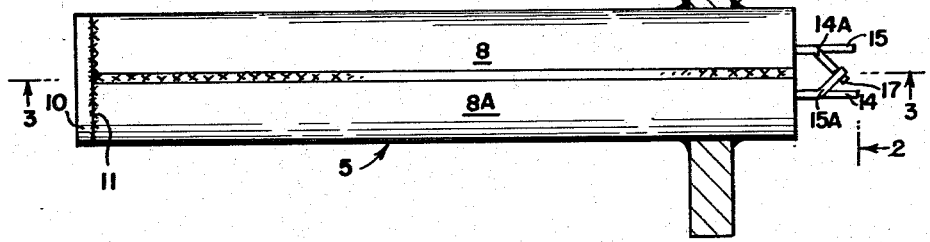
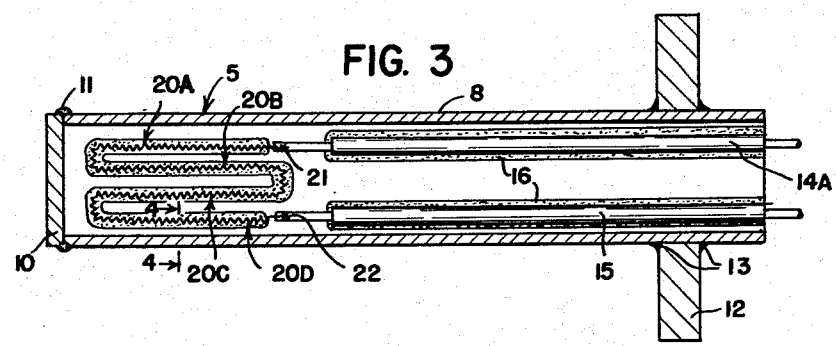
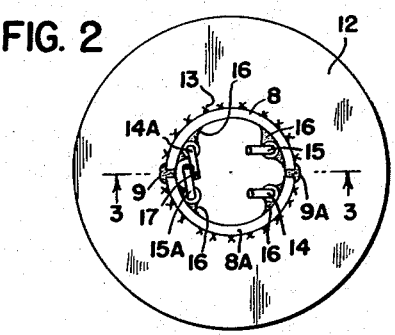
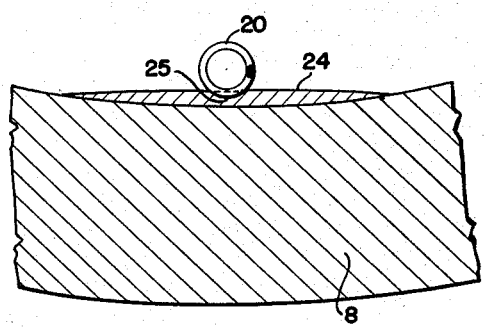
INVENTORS
FRANK D. WERNER
ROBERT R. KOOIMAN
STANLEY J. NOVAK
BY *Dugger & Johnson*
ATTORNEYS INVENTORS
FRANK D. WERNER
ROBERT R. KOOIMAN
STANLEY J. NOVAK
BY Hugger & Johnson
ATTORNEYS Dec. 10, 1963     F. D. WERNER ETAL     3,114,125
TEMPERATURE PROBE Filed April 18, 1961     5 Sheets-Sheet 3

INVENTORS
FRANK D. WERNER
ROBERT R. KOOIMAN
STANLEY J. NOVAK
BY Dugger & Johnson
ATTORNEYS

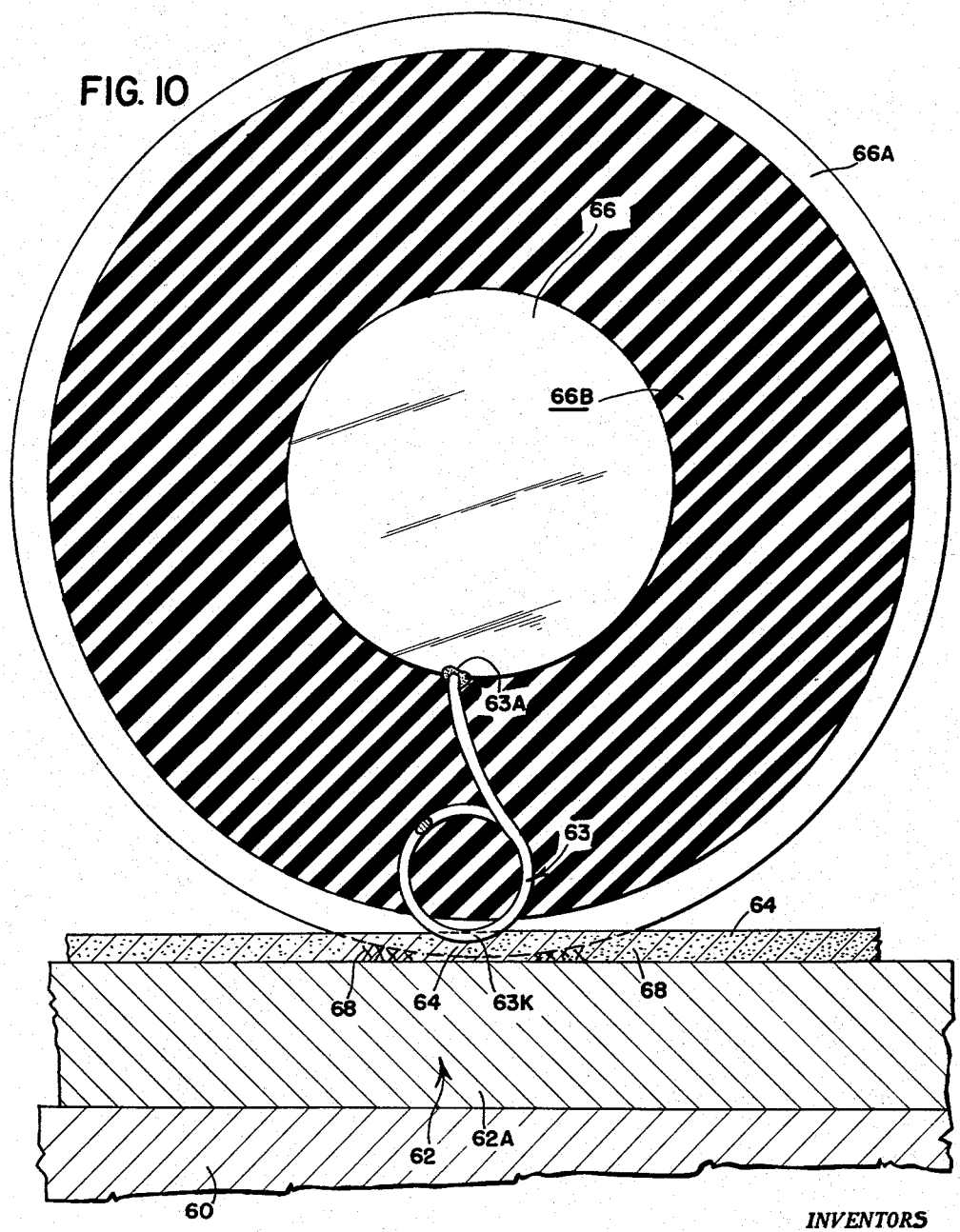

Dec. 10, 1963  F. D. WERNER ETAL  3,114,125
TEMPERATURE PROBE
Filed April 18, 1961  5 Sheets-Sheet 5

INVENTORS
FRANK D. WERNER
ROBERT R KOOIMAN
STANLEY J. NOVAK
BY Dugger & Johnson
ATTORNEYS

United States Patent Office 3,114,125
Patented Dec. 10, 1963

3,114,125
TEMPERATURE PROBE
Frank D. Werner, Robert R. Kooiman, and Stanley J. Novak, all of Minneapolis, Minn., assignors to Rosemount Engineering Company, Minneapolis, Minn., a corporation of Minnesota
Filed Apr. 18, 1961, Ser. No. 103,907
13 Claims. (Cl. 338—28)

This invention relates to temperature probes, sometimes called temperature sensors, wherein the temperature sensing element is a resistance wire and in which the construction is such as to have a very low thermal capacity and low time for response, and low degree of error due to strains imposed upon the resistance element by changes in temperature.

It is an object of the invention to provide a temperature probe having a very low thermal capacity.

It is another object of the invention to provide a temperature probe having a low time of response.

It is a more specific object of the invention to provide a temperature probe having a resistance wire temperature sensing element which is substantially less subject to strain imposed errors.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings in which:

FIGURE 1 is a side elevational view of an examplary form of the invention.

FIGURE 2 is an end elevational view taken in the direction of arrows 2—2 of FIGURE 1.

FIGURE 3 is a sectional view taken along the line and in the direction of arrows 3—3 of FIGURES 1 and 2.

FIGURE 4 is a very much enlarged fragmentary sectional view taken in the direction of arrows 4—4 of FIGURE 3.

FIGURES 8, 9 and 10 illustrate another embodiment of temperature sensor device.

FIGURE 8 is a longitudinal sectional view through the sensor and a portion of the device in which it is mounted.

FIGURE 9 is an enlarged sectional view taken at 9—9/10 of FIGURE 8.

Figure 9:
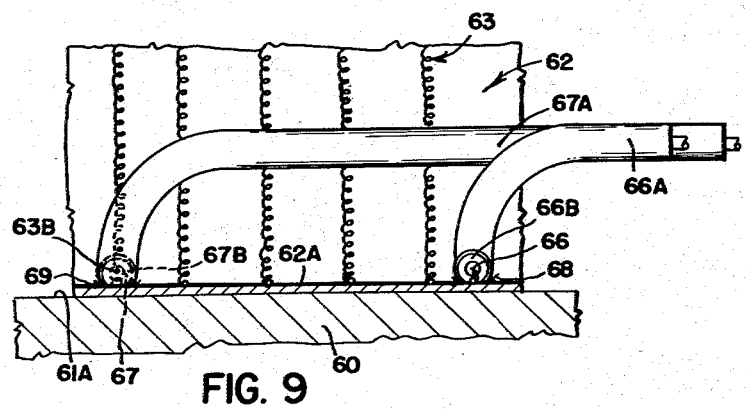

FIGURE 10 corresponds to the portion at the right end of FIGURE 9 and is very much enlarged. FIGURE 10 is a section at line 10—9/10 of FIGURE 8.

Figure 11:
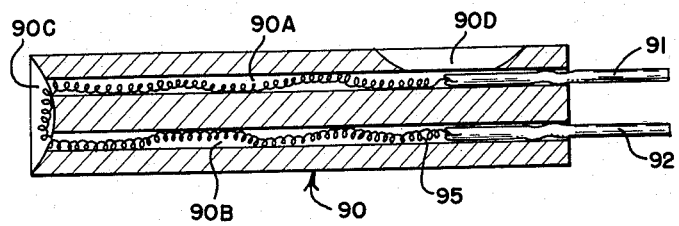
Figure 12:
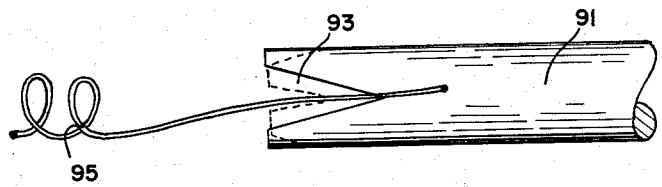

FIGURES 11 and 12 illustrate another modified form of the invention, FIGURE 11 being a longitudinal sectional view and FIGURE 12 an enlarged fragmentary side elevational view of one of the lead wires and a portion of the resistance wire of the device shown in FIGURE 11.

Throughout the drawings, corresponding numerals refer to the same parts.

Referring to the embodiment shown in 1–4, the temperature sensor comprises a mounting surface, which in FIGURES 1–4 is in the form of a closed end cylinder assembly generally designated 5, which is composed of two half-tubes 8 and 8A, that are welded together at seams 9 and 9A when the device is completed. The thus formed tube is closed at one end by cap 10 which is welded at 11 to the tube 5. The environment of which the temperature is being sensed is intended to be on the outside of the cylinder assembly 5. The thickness of the wall 8 (also 10) depends upon the pressure to be withstood. Where desired, a mounting may be provided by welding on a flange, which is welded on at welds 13—13. Any sort of mounting may be provided, according to the particular installation.

According to this invention the element which senses the temperature is a resistance wire, which can be any of a wide variety of types of wire such as nickel, platinum, tungsten, copper and certain other metals and alloys, and this resistance wire is attached to the sensing surface by adhesion throughout only a portion of its length. Thus the resistance wire element may be bent in a zig-zag configuration or as a hairpin shape and only the bends attached. An easier way is to wind the resistance in the form of a helix and attach it by adhering only portions of the turns of the helix to the mounting surface. The helix should preferably not be incased in the adhering material.

Thus in FIGURES 1–4, the inside surface of each half-tube 8 and 8A, before being assembled together, provides an easily accessible mounting surface and to each such surface there are attached two insulated lead in wires 14A and 15 for half cylinder 8 and 14 and 15A for half cylinder 8A. The insulation of each wire spaces the wire from the inner surface of the half-cylinder (8 or 8A).

All lead in wires are attached by means of adhesive as at 16. The leads 14A and 15A are wired together at 17, so that the completed unit of the half cylinder 8 is in series with the completed unit of half cylinder 8A.

The temperature responsive resistance wire of half cylinder 8 is the helically wound wire 20 which has one end welded or soldered at 21 to the lead wire 14A, and the other end welded or soldered at 22 to the lead wire 15. The wire 20 is a coil of small diameter, as shown in FIGURE 4, and is fastened to the inner surface of the half cylinder 8 by means of a thin layer 24 of electrically non-conductive cement. The helix is not imbedded but is attached by being only slightly sunk into the surface of the adhesive, as at 25. The cement may entirely enclose the arcuate portions of successive turns of the helix which are proximate tube 8 or the such arcuate portions of the successive turns can be only partially submerged in the adhesive as shown in FIGURE 4. The body of adhesive below the helix, that is to say, between the helix and the inner surface of the half cylindrical shell, acts as an electrical insulator between the successive turns of the helix and between the helix and the shell 8.

A wide variety of cements may be used, depending upon the temperature range at which the probe is intended to operate. For low temperatures the cement can be a smear of rubber cement, upon which the helical coil of resistance wire is "floated" as it is laid down, according to any pattern, as for example as shown in FIGURE 3, where the helical coil of wire 20 makes several passes back and forth at 20A–20D. As many passes as are needed to use the length of the helical coil, are laid down, care being taken that the helix is not submerged in the cement.

For higher temperatures the adhesive can, for example, be a smear of silicone resin or an aqueous frit slurry of glass or enamel can be applied to the interior surface of the shell, and the helix carefully laid onto it and then fired to melt the glass until it bonds to the helix.

The lead in wires and insulation for them are selected of materials which are compatible with the temperatures intended for the probe. Where low temperatures are to be encountered the insulation on the leads can be any of several plastic materials and can be fastened in place with rubber cement, silicone resin cement or the like. For higher temperatures the insulation on the lead-in wires can be asbestos or glass and the cements for holding them can be any of a variety of high temperature cements or glass, fired to bond the insulation to the half cylinder shells.

After the two half cylinder shells 8 and 8A, each with its resistance wire 20, and lead in wires placed as aforesaid, have been completed, the two half cylinders are placed with the edges in abutment and they are fastened together by soldering, brazing or welding (the method being dependent upon the temperatures expected to be encountered) and the end piece 10 and fastening flange 12 are then affixed. The two lead wires 14A and 15A are then connected and the unit is ready for use. It may be noted that soldering or brazing and even welding for fastening the two half cylinders, and 10 and 12 can be used without adverse effect on the cements used, since many plastics and elastomers will withstand soldering temperatures. Glass frit glazes will withstand even welding temperatures.

The completed unit is then ready for use. The only partial attachment of the helix permits a strain-free condition to be maintained in the helix, even though the shell (8—8A—10—12) may change dimension due to the changes in environmental temperatures, being sensed. At the same time the substantial absence of mass for supporting the resistance wire 20 permits it to follow changes of temperature very rapidly. If desired the end of the tube, adjacent the collar 12 can be plugged and the lead wires can be brought out through a glass seal, and any selected atmosphere such as air, argon, helium, nitrogen, etc. can be sealed in the tube. Evacuating the tube further reduces the mass of material influencing the temperature of the resistance wire and further reduces the time of response factor. Such an end closure is illustrated in FIGURE 5, which will be described.

The ratio of thickness of the tubular shell to the diameter of the helix may be varied.

Figure 5:
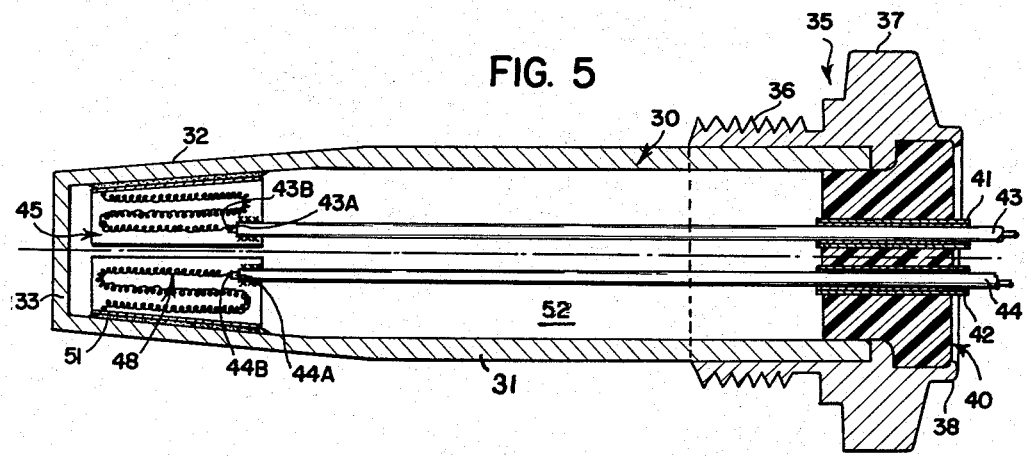
FIGURE 5 is a longitudinal sectional view of a modified form of the invention.
Figure 6:
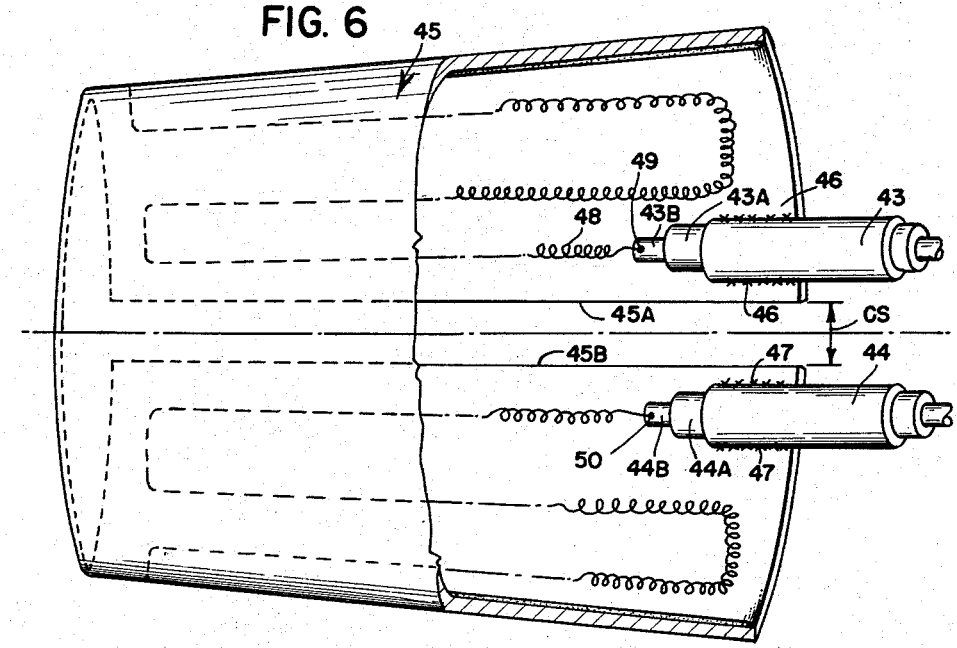
FIGURE 6 is an isometric view, partly broken away showing the construction of the temperature sensing element of the device shown in FIGURE 5.
Figure 7:
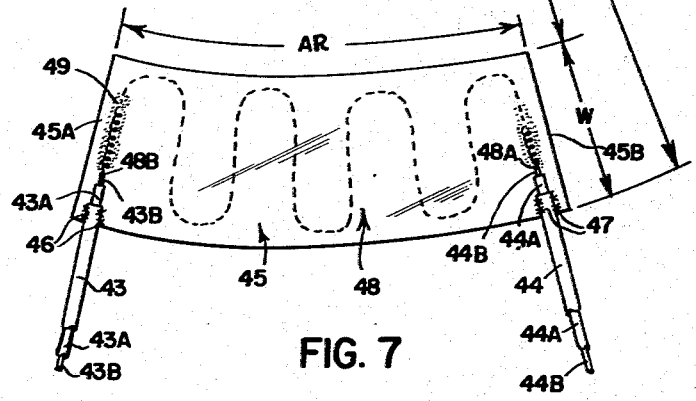
FIGURE 7 is a developed view of the device shown in FIGURES 5 and 6, as it appears in plan view, during manufacture.

In FIGURES 5, 6 and 7 there is illustrated a form of the invention which may be utilized with a one-piece tubular shell. In FIGURE 5 the protective shell, generally designated 3, is in the form of a one piece deep-drawn cup or closed-end tube, which can be similar to a cartridge case. The shell 30 has a slightly thicker wall at 31 than at end 32, and end 32 is made with a slight taper of around 2°-10°. The end 33 is integral. The shell is attached hermetically to a fitting 35 which has threads at 36 and a wrench-hold at 37. The fitting is internally flanged to receive a glass seal 40 which is sweated or soldered in place or may be held by beading 38, and in any event provides electrical insulation for the lead-wires and a gas tight seal to the fitting 35. The glass seal has two metal tubes 41 and 42 which are large enough to permit the metal-sheathed lead wires 43 and 44 to pass therethrough. These lead wires have an external metal sheath and an insulated lead wire passing therethrough. The insulation is at 43A and 44A respectively and the lead wires themselves are 43B and 44B respectively. The insulations project a little beyond the sheaths at the internal ends (left end in FIGURE 5) and the lead wires project a little further beyond the insulation. The lead wires 43C and 44C are thus supported centrally in respect to the sheaths which encompass and support them.

The resistance element 48 and its support sheet 45 and the shielded lead wires 43 and 44 are prefabricated as a separate sub-assembly, illustrated in FIGURES 6 and 7 and later assembled in the shell 30. The mode of construction can best be understood from FIGURES 6 and 7. Referring to FIGURE 7, there is first prepared a piece of thin metal sheet 45 such as silver sheet, which will serve as the base for fastening the resistance wire itself by adhesion, as previously described. From a stock sheet of silver there is cut a segment 45 which is an arcuate portion of an annulus, having an arcuate length AR and inner radius IR and outer radius OR and width W and end edges 45A and 45B such that, when the segment is curled, it will form a frustrum of a cone to fit into and seat against the inner surface of the conical end part 32 of shell 30. When thus curled the sheet 45 appears as in FIGURE 6. It is best to make the arcuate length AR such that there will be a little clearance space CS, see FIGURE 6, between the end edges 45A and 45B when they are brought into proximity, since nothing is gained by crowding.

After the sheet 45 has been prepared and while it is still flat, as in FIGURE 7, the metal sheathed lead wires are arranged as shown in FIGURE 7, and the sheaths of the lead wires are overlapped, the outer edge of sheet 45 at the corners and the metal sheaths of the lead wires are then fastened to sheet 45 by adhesive or solder, as at 46 and 47. The lead wires are, of course, chosen with insulation such that, when the lead wire sheaths are attached to sheet 45 by solder, the insulation will not be damaged. It will be noted that the lead wires extend more or less radially in respect to the configuration of the arcuate segment 45, and since the lead wires are moderately stiff and are attached at the corners of the segment, and because segment 45 is of quite thin sheet, the lead wires act more or less like handles, which facilitate placing the segment (when in the FIGURE 6 condition) down through the length of tube 30 (see FIGURE 5) and into final position in conical end 32.

While sheet 45 is still flat, as in FIGURE 7, the side to which lead wires 43 and 44 are attached is coated with a thin smear of adhesive 49 or frit and the helical coil of resistance wire 48 is gently laid down according to any pattern as illustrated in FIGURE 7, and the ends of the resistance wire are soldered or welded at 48A to the protruding end of lead wire 44B and at 48B to the protruding end of lead wire 43B. It should be noted that the thickness of the lead wire sheaths and insulation layers causes the lead wire itself to be supported slightly above the surface of sheet 45. Care is taken that adhesive or frit slurry layer 49 applied to sheet 45 is a thin layer, yet thick enough to be several times as much as the diameter of the resistance wire 48, as shown in FIGURES 4 and 10, and the helical turns of the resistance wire (or the bends therein if the configuration is other than helical) are "floated" onto the adhesive so as to be adhered to the adhesive 49 but not enough to submerge the helix. The preferred depth of penetration is to be less than the diameter of the resistance wire in the helix, but submergence may be up to half the diameter of the helix, more or less (see FIGURES 4 and 10). Obviously the laying down of the helix is a delicate operation and care should be exercised. The adhesive 49 can be rubber compounds for low temperatures or plastics for intermediate temperatures, and glass or ceramics for high temperatures. Where the adhesive 49 is a glass frit, it is fired to consolidate the glass and form it in adhesion to the helix. Where this is done, it is usually desirable to attach the lead wires after firing and the sheet 45 can be bent to the frustro-conical configuration to fit its position in FIGURE 5, before firing. Also, glass frit may if desired by applied to only narrow lines where the helical coil is to be laid down, to avoid an over-all coating. This lends flexibility to the unit. As a further aid to maintenance of flexibility the helix may be gently laid on another surface (not 45) that is precoated with glass frit slurry and then gently lifted and re-laid on the piece 45. The adhering droplets of slurry on each helix turn hold each helix turn elevated and out of contact with sheet 45 and after firing the turns are thus independently supported on tiny islands of glass. The use of an oxidized metal such as anodized aluminum for marking sheet 45 provides a thin electrically insulating coating thereon.

The unit as shown in FIGURE 7 is then curled to the shape shown in FIGURE 6, with the lead wires 43 and 44 and resistance wire 48 on the inner surface. The outer surface of sheet 45 is bare, when in the shape shown in FIGURE 6.

After manufacture of the unit as shown in FIGURES 6 and 7, the formed unit is lowered into the shell 30 and pressed firmly into contact with the inner surface of wall 32 and secured by an adhesive or solder layer 51, the end closure 40 is then slipped onto the lead wires and closure 40 is hermetically sealed to unit 35. The sheaths of lead wires are then soldered to sleeves 41 and 42. Where an inert atmosphere or evacuation is desired for space 52 (within shell 30), a seal-off tube (not shown) may be provided for closure 40 and the inert gas or evacuation effected therethrough. The device is then ready for calibration and use.

The configuration shown in FIGURES 5–7 is most useful in those situations where the inner size of the frustro-conical shape of the sheet 45 (as shown in FIGURE 6) is so small that it is unhandy to work on the inside for placing the resistance wire, etc. and it is therefore worked on while flat. Where the frustro-conical shape is large enough to permit placing the adhesive and resistance, and placing and connecting the lead wires the frustro-conical shape can be preformed, according to the exemplary configuration shown in FIGURES 8, 9 and 10.

Figure 8:
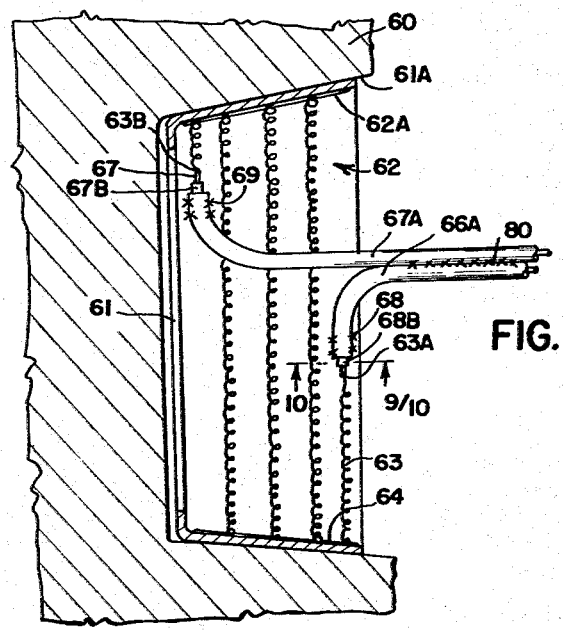

Thus in FIGURE 8, in the environmental wall 60, there is bored a recess 61 having a frustro-conical wall 61A, and it is against this wall that the temperature sensor is placed. The temperature sensor is a little pan 62 which has walls which match the taper of the recess 61—61A in which the pan is seated when finished. Seating can be merely by pressure or with an adhesive between wall 62A of the pan and wall 61A of the recess. The pan may have a bottom, or partial bottom or no bottom. It is illustrated in FIGURE 8 with a partial bottom.

Pan 62 is large enough in diameter so as to allow space to work inside. On the inner surface of pan wall 62A there is smeared on a layer 64 of adhesive or frit (slurry) (see FIGURE 10), and the length of resistance wire helix, generally designated 63, is gently laid down upon and adhered to the surface of the adhesive according to the method previously described herein. In FIGURES 8 and 9 there are a plurality (five) "turns" of the resistance wire helix beginning at junction 63A and terminating at junctions 63B. These junctions are on the ends of the lead wires 66 and 67, which are metal sheathed. The lead wires are shaped as shown in FIGURES 8 and 9 so as to run towards the pan 62 and then turn and run down, so that the sheaths lie parallel to and in contact with the inner surface of the pan 62 for a little way, where they are attached to soldering. Thus sheath 66A is attached by solder 68 to the inner wall of pan 62. Insulation 66B protrudes a little way beyond the end of the sheath and wire 66 protrudes further and junction 63A connects the end of resistance 63 to the wire 66. Similarly, metal sheath 67A of wire 67 is soldered to pan 62 at 69 and insulation 67B protrudes a little and wire 67 protrudes further and junction 63B connects the wire 63 to the lead wire 67. The two lead wire sheaths can be soldered together at 70, see FIGURE 8, to give them greater mechanical stability. From FIGURE 10 which, in greatly enlarged form, shows an end view of lead wire 63 at junction 63A, it will be noted that the lead wire sheath 66A even though small (Example: 40 to 80 mils) is yet enormously larger than the resistance wire helix 63 (Example: Helix diameter 3 to 6 mils), and the helix 63 of resistance wire is yet again much larger than the wire of which it is formed (Example: 0.2 to 1 mil) and larger than the thickness of the adhesive layer 64 (Example: 0.5 to 1 mil). It will be appreciated that these dimensions are only exemplary. They can be varied without departing from the spirit of the invention. Note, in FIGURE 10 the "floatation" of the helix 63 on the surface of adhesive 64 at partial submergence area 63K. The surface tension of the adhesive, when in liquid condition assists in this condition of "floatation" and provides adequate adhesive-to-resistance wire contact for the purposes of this invention. At the same time an adequate body 64B of adhesive below the helix 63, thus insuring electrical insulation of the helix in respect to pan 62. At the same time most of the helix is supported free-standing above the surface of adhesive 64 and is thus able to prevent mechanical stressing of the resistance wire, which would otherwise occur if the wire were submerged in the adhesive for any substantial part of its length. In this way stress induced variations (errors) in electrical resistance in the resistance wire 63 are, to a great extent, avoided.

Utilizing the present invention it is possible to provide temperature probes of great ruggedness and accuracy having time constants of 150 milliseconds, and less.

It will be evident from the foregoing that a sensor in flat configuration, such as in FIGURE 7, may be used flat by merely fastening it by adhesion, soldering or by holding it mechanically to a flat surface, the temperature of which is to be sensed. For such (flat configuration) installations the sensor can be of any plan shape, such as circular, rectangular, etc. rather than arcuate, as illustrated. Also in some instances, it is desirable to apply the sensor directly to the outer surface of a container (such as a tank, tube, etc.) the temperature of which is to be sensed. Hence, in its broadest sense, the surface 8 (FIGURE 4) or 45 (FIGURES 5, 6 and 7) or 62 (FIGURES 8, 9 and 10) can be any surface, either interior or exterior.

In FIGURES 5–7 the supporting surface 45 and in FIGURES 8–10 the supporting surface 62, may, if desired, be of ceramic material such as glass, quartz or porcelain, rather than metal.

FIGURES 11 and 12 illustrate a modified form of the invention which may be made very economically, and which, for many purposes, provides very satisfactory results. In this form of the invention there is provided a ceramic tube 90 which can be produced with two or more holes in it. Two holes are shown at 90A and 90B. The tube is cut off to the desired length and then, using a diamond saw, a saw cut is made into the end of the tube at 90C so as to intersect and connect the holes 90A and 90B and another saw cut is made lengthwise of the tube at 90D so as to intersect one of the holes in this instance hole 90A. The holes 90A and 90B are of a size so that they receive with some clearance the lead wires 91 and 92 and the lead wires may be crimped slightly so as to drag a little in their holes.

Each lead wire has a V-notch cut in it as at 93 for lead wire 91, see FIGURE 12. The resistance wire 95 is a coil (helix) and the end of the resistance wire is straightened out and laid in the notch, which is then crimped to cold-weld (grip) the resistance wire. The crimped effect is shown in dotted lines in FIGURE 12. The lead wires 91 and 92 with resistance attached are then fed into holes 90A and 90B and positioned as in FIGURE 11. Care is taken that the resistance of wire 95 is larger than needed, and that wire 91 is positioned so that access can be had through slot 90D to the crimped V-notch end of wire 91.

Where a longer resistance is desired than can be accommodated by two holes 90A and 90B, four or more holes may be used, with saw cuts at the ends joining the holes where the wire passes over. The wire is then threaded back and forth through the holes and the lead wires finally placed in two holes as illustrated. In this way as many passes back and forth from end to end of the tube may be made as is necessary to accommodate the length of the (helically coiled) resistance wire.

A thin slurry of ceramic frit and water or other liquid carrier is then fed into the holes 90A and 90B (and as many as are used) until they are filled. The slurry is made very thin. The fluid carrier of the ceramic frit slurry is then distilled off leaving only a fine layer of ceramic frit material deposited on the inner surface of the holes 90A and 90B of the ceramic tube, and contacting the turns of the helically wound resistance wire 95 wherever the turns touch the walls of holes 90A and 90B. The unit is then brought to firing temperature of the ceramic frit which accordingly melts and forms a glaze which bonds the helical turns of the wire 95 to the inner surfaces of holes 90A and 90B wherever the turns of wire touch the tube, and at the same time the resistance wire is annealed. The slurry is made thin so that the glaze does not cover more than the touching points of the (helix) wire and the walls of the holes. This ceramic bonding is secured enough to hold the wire 95 in place and yet it permits the adjustment of the amount of the resistance wire. Adjustment of the amount of resistance is accomplished as follows:

A tweezers or scalpel is introduced through the slots 90D and the V-notch crimp at the end of lead wire 91 is opened just enough to release the resistance wire 95. This notch is preferably only slightly crimped initially so that it can be opened easily. The end of wire 95 is then drawn back out of the slot. Enough wire is then withdrawn so as to reduce the amount of resistance to the desired amount as measured from lead wire to lead wire and the notched end of lead wire 91 is then again crimped on the resistance wire 95 by using a tweezer through notch 90D. The ceramic bond between the helical turns of the resistance wire adjacent the end of lead wire 91 is not so much that it will hold wire 95 against detachment of a few turns of the helix for withdrawing a small amount of wire for adjusting the resistance as aforesaid.

After proper adjustment has been made, the notches 90C and 90D are coated with a small amount of ceramic frit slurry or cement and fired so as to melt the frit, which accordingly closes the slots 90C and 90D. When this is done the element is ready to be used, either directly or it may be positioned in a metallic protective well.

Although this sensing element of FIGURES 11-12 does not have as low a thermal mass as the modifications previously described, the ceramic tube may be obtained in very small sizes so that the design permits a smaller size element while maintaining a reasonably small thermo mass, and while utilizing the invention for supporting the resistance wire turns only at those portions of the turns which contact the supporting surfaces. In this manner the resistance wire is supported in a strain-free manner.

As many widely apparent different embodiments of this invention may be made without departing from the spirit and scope thereof, it is to be understood that we do not limit ourselves to the specific embodiments herein.

What we claim is:

1. A temperature probe comprising a supporting surface, a temperature sensitive resistance wire in the form of a helix positioned with reference to the supporting surface so that the axis of the helix generally parallels said supporting surface, the spacing between the turns of said helix and said surface decreasing to minimums where said helix turns are proximate to said surface and an electrical insulation connecting said surface and portions of the helix turns where said helix turns are proximate said surface for supporting the whole helix in spaced relation relative to said surface the remainder of the helix being substantially uncoated and free standing.

2. The temperature sensor of claim 1 further characterized in that the insulation only partially envelopes the wire of the helix in said proximate portions of said helix turns.

3. The temperature sensor of claim 1 further characterized in that the electrical insulation envelopes the wire in the helix to a depth less than about one half the full diameter of the helix.

4. The temperature sensor of claim 1 further characterized in that the electrical insulation is a hardened, originally adhesive material.

5. The temperature probe specified in claim 1 further characterized in that the electrical insulation is a solidified plastic.

6. The temperature probe specified in claim 1 further characterized in that the electrical insulation is a ceramic material.

7. The temperature probe specified in claim 1 further characterized in that the supporting surface is the inside surface of a containing well.

8. The temperature probe specified in claim 1 further characterized in that the supporting surface is the inside surface of a frusto-conical shape.

9. The temperature probe specified in claim 1 further characterized in that the supporting surface is a flat sheet.

10. A temperature probe comprising a containing well having an interior supporting surface, a helically wound coil of electrical temperature sensitive resisance wire positioned with the axis of the helix in a plane generally paralleling the supporting surface and electrical insulating material on the well interior supporting surface at least partially embracing the wire in that portion of the turns of the helix which are proximate the surface for attaching the helix to the surface for attaching the helix to the well the remainder of the turns of the helix being free standing and substantially free from said insulating material.

11. The temperature probe of claim 10 further characterized in that the supporting surface is of electrically conductive material and said electrical insulating material is a solidified electrically insulating adhesive.

12. The temperature probe of claim 11 further characterized in that the insulating material is plastic.

13. The temperature probe of claim 11 further characterized in that the insulating material is a ceramic glaze.

References Cited in the file of this patent

UNITED STATES PATENTS

| | | |
|---|---|---|
| 1,411,396 | Wilson et al. | Apr. 4, 1922 |
| 2,149,448 | Lederer et al. | Mar. 7, 1939 |
| 2,465,981 | Robertson | Mar. 29, 1949 |
| 2,493,311 | Odell | Jan. 3, 1950 |
| 2,750,483 | Voorman | June 12, 1956 |

FOREIGN PATENTS

| | | |
|---|---|---|
| 1,218,724 | France | May 12, 1960 |